2,693,485

PROCESS FOR PRODUCING METAL SALTS OF ALKYLENE BIS-DITHIOCARBAMIC ACIDS

Richard J. Gobeil, Wilmington, Del., assignor to E. I. du Pont de Nemours and Company, Wilmington, Del., a corporation of Delaware No Drawing. Application May 22, 1952,
Serial No. 289,445

7 Claims. (Cl. 260—500)

This invention relates to processes for the preparation of metal salts of alkylene bis-dithiocarbamic acids. More particularly, it relates to processes in which such a salt is formed by the interaction of carbon disulfide, an alkylene diamine, and a strong metal hydroxide base by bringing together those reagents for reaction by introducing carbon disulfide and the metal hydroxide into contact with the alkylene diamine in an aqueous medium, while agitating the resulting aqueous mass, at such rates relative to each other as to keep the pH of the aqueous mass within the range of 8.5 to 11.0 throughout the reaction period. Still more specifically, the invention relates to processes for the preparation of aqueous solutions of disodium ethylene bis-dithiocarbamate.

It has heretofore been the practice to prepare water-soluble salts of alkylene bis-dithiocarbamic acids, such as disodium ethylene bis-dithiocarbamate, by the addition of carbon disulfide to mixture of alkylene diamine and a strong base. In other words, the reaction between the amine and carbon disulfide was carried out in the presence of a strong base. This can be termed the "highly alkaline" process. Such a process is taught in U. S. Patents 2,317,765 and 2,504,404. The water-soluble alkylene bis-dithiocarbamates so formed have found use as toxicants for the control of fungi and as intermediates for use in preparation of water-insoluble metal alkylene bis-dithiocarbamates such as zinc, iron, manganese, or copper ethylene bis-dithiocarbamate.

The water-soluble alkylene bis-dithiocarbamates produced by the "highly alkaline" process are, however, of relatively low purity, containing by-products as contaminants; as a result, the yield of product is poor. Aqueous solutions of alkylene bis-dithiocarbamates, such as disodium ethylene bis-dithiocarbamate, obtained by this method are relatively unstable; on cooling, solids separate and these solids do not redissolve readily on heating; additionally, such solutions usually have a rather strong hydrogen sulfide odor and contain thiocarbonates. Fungicidal preparations made therefrom tend to be phytotoxic thus limiting their value as agricultural fungicides.

More recently, an improved process for making disodium ethylene bis-dithiocarbamate and similar water-soluble alkylene bis-dithiocarbamates has been discovered and is disclosed and claimed in Flenner application, Serial No. 93,430, filed May 14, 1949, and now U. S. Patent No. 2,609,389, issued Sept. 2, 1952. The Flenner process is, in a sense, the reverse of the "highly alkaline" process in that the alkylene diamine and carbon disulfide are first reacted to form an intermediate product and then the strong base is introduced to react with the intermediate product.

The products of the Flenner process while improved with respect to impurities, stability, and phytotoxicity still contain some objectionable by-products or decomposition products as indicated, for example, by the deep orange color normally associated with aqueous solutions of sodium ethylene bis-dithiocarbamate prepared by the process and by the presence of some hydrogen sulfide odor.

I have now discovered processes for making still more improved metal ethylene bis-dithiocarbamates. Thus, for example, aqueous disodium ethylene bis-dithiocarbamate solutions prepared according to my invention contain very little undesirable by-product, are light in color, and have little or no hydrogen sulfide odor. Moreover, practically no hydrogen sulfide is liberated from the reacting mass in the practice of the processes of the invention.

The improved products are obtained by forming the desired water-soluble metal salt of an alkylene bis-dithiocarbamic acid by combining and reacting carbon disulfide, alkylene diamine, and a strong metal hydroxide base under carefully controlled pH conditions such that the pH of the reacting mass is above about 8.5 but is not above about 11.0 thruout the period of bringing together the three reagents. In other words, the process is carried out so that the metal hydroxide is not brought into contact with either the other reagents, or the reaction products of those reagents in a reacting mass having a pH outside the range of about 8.5 to 11.0. Still more preferably, the pH is maintained between about 9.0 and 10.5 thruout the period of bringing together the three reagents.

The alkylene diamines suitable for use in the processes of the invention are those having hydrogen atoms available on the nitrogen atoms of the amine groups. Preferably lower alkylene diamines are employed, that is, those containing from 2 to 6 carbon atoms inclusive, namely, the ethylene, trimethylene, tetramethylene, pentamethylene, or hexamethylene diamines.

The strong metal hydroxide bases suitable for use in the processes of the invention are those having a basic (hydroxyl ion) dissociation constant greater than that of the alkylene diamine used. Metal hydroxides preferred because of their availability are the sodium, potassium, and calcium hydroxides.

The processes of the invention are carried out in the presence of water as a reaction medium and as a solvent for the alkylene diamine. The water should be used in amount sufficient to maintain the reacting mass in a fluid easily stirred form thruout the process.

Various manipulative techniques can be used to bring the reagents together to effect reaction within the critical pH conditions required. Thus, the process can be conducted batchwise. Such a method is conveniently practiced, for example, by first charging an aqueous solution of the alkylene diamine into a reaction vessel equipped with an agitator. Such a solution generally has a pH of 12.0 and upward.

While agitating the aqueous solution of alkylene diamine, carbon disulfide is added until the pH is lowered to within the range of 8.5 to 11.0 and, preferably, 9.0 to 10.5. Then while maintaining agitation, the metal hydroxide and carbon disulfide are added gradually simultaneously, either continuously or in intermittent small increments, while frequently or continuously measuring the pH and adjusting the relative feed rates of the metal hydroxide and carbon disulfide as required to keep the pH of the reacting mass within the aforementioned range. Slight variations from the recited pH ranges for short periods during the reaction, such as might be occasioned, for example, by inexact proportioning for a time of the reagents being added, does not seriously affect the quality of the product obtained, and it will be understood, therefore, that such operation is within the spirit of the invention.

The introduction of carbon disulfide and metal hydroxide is continued until substantially all the alkylene diamine has reacted; in other words, until the stoichiometric amount of carbon disulfide required to form the alkylene bis-dithiocarbamate has been consumed in the reacting mass. At that point, if the pH of the liquid mass is below about 10.0, a more stabilized aqueous solution of the product is obtained by adding a small additional amount of the metal hydroxide to bring the pH to within the range of 10.0 to 11.5 and, preferably, 10.0 to 11.0.

Alternatively, processes of the invention can be carried out continuously by feeding carbon disulfide and a metal hydroxide into a turbulent stream of an aqueous alkylene diamine solution as in a pipe-line reactor, taking care, of course, that the rate and location of introduction of the carbon disulfide and metal hydroxide reagents are chosen so as to maintain the reacting mass within the required pH range.

In carrying out the processes of the invention, one reacts approximately two mols of carbon disulfide for each mol of the alkylene diamine, and in the order of either one mol or two mols of the metal hydroxide for each mol of the diamine depending upon the valency of the base cation, one mol being used, for example, if the base is calcium hydroxide and two mols with a base such as sodium hydroxide.

The processes of the invention are preferably carried out at a temperature not in excess of about 60° C. and still more preferably, in the range of 40 to 55° C. The reactions involved in the processes of the invention appear to proceed almost instantaneously at temperatures within the latter range. At temperatures above 55° C., some pressure is required because of the low boiling point of carbon disulfide. Temperatures substantially in excess of 60° C. are not practical because of excessive decomposition of the product at such temperatures. Lower temperatures, say down to about 10° C., can also be employed but then the reaction rates are lower and the reagents must be brought together more slowly.

According to a preferred embodiment of the invention, carbon disulfide is added gradually with agitation to a solution consisting essentially of ethylene diamine in water to lower the pH of the ethylene diamine solution to within the range of 9.0 to 10.5. Carbon disulfide and an aqueous solution of sodium hydroxide are then fed gradually with agitation into the pH-adjusted ethylene diamine at a temperature of about 40° C. to 55° C. and at such rates relative to each other as to keep the pH of the resulting reacting aqueous mass within the range of 9.0 to 10.5 until approximately two mols of carbon disulfide have been consumed in the reacting mass for each mol of ethylene diamine used in the process. The introduction of carbon disulfide is then terminated and if the pH of the aqueous mass is below 10.0, additional sodium hydroxide is added as required to bring the pH to within the range of 10.0 to 11.5.

In the last mentioned preferred process, it is still further preferred to start with an aqueous solution of ethylene diamine containing 10 to 40% by weight of the diamine and to add the sodium hydroxide in the form of an aqueous solution containing 10 to 60% by weight sodium hydroxide. According to this embodiment, the disodium ethylene bis-dithiocarbamate product is obtained in the form of a 15 to 60% solution.

In order that the invention may be better understood, the following examples are given in addition to the examples already given above.

*Example 1*

To a glass reaction vessel equipped with a suitable agitator, reflux condenser, thermometer, dropping funnels, and electrodes for the measurement of pH, was charged 1.5 mols of ethylene diamine as a 19.5% aqueous solution. To this aqueous solution, carbon disulfide was added with agitation at a temperature of 42–6° C. until the pH dropped from 12.1 to 9.3. At this point, gradual simultaneous addition of sodium hydroxide, as an 18.8% aqueous solution, and carbon disulfide was started, the relative rates of addition being adjusted as required to maintain the pH at about 9.3. The temperature of the reacting mass was kept at 42–6° C.

The gradual introduction of carbon disulfide was stopped after a total of 3 mols of carbon disulfide had been introduced into the reaction vessel and had been consumed in the process as indicated by the fact that no unreacted carbon disulfide phase was visible in the aqueous reaction mass. A small amount of aqueous sodium hydroxide solution was then added to raise the pH to a final level of approximately 10.8. A total sodium hydroxide consumption in the process of approximately 3.0 mols.

In order to maintain the desired pH during the joint addition of carbon disulfide and sodium hydroxide, it was found necessary to diminish sharply the rate of addition of sodium hydroxide during the latter portion of the joint addition. No hydrogen sulfide was evolved during the reaction.

The aqueous solution of disodium ethylene bis-dithiocarbamate produced according to this example was pale yellow in color and free from hydrogen sulfide odor.

The aqueous product was analyzed for purity and yield by the carbon disulfide evolution method described in Anal. Chem. 23, 1842 (1951), "Determination of Dithiocarbamates" by D. G. Clarke, H. Baum, E. L. Stanley, and W. F. Hester. According to this method, an aliquot sample of the solution is digested at 100° C. in the absence of air with 4.5 N sulfuric acid. Any hydrogen sulfide formed during the digestion of the sample is absorbed in aqueous cadmium chloride prior to the absorption of carbon disulfide which is liberated. The liberated carbon disulfide is absorbed in methanolic potassium hydroxide and the resulting xanthate is titrated with standard iodine solution. Under the digestion conditions of this technique, the dithiocarbamate group breaks down quantitatively with liberation of carbon disulfide. The amount of hydrogen sulfide formed is taken as an index of impurities since with pure disodium ethylene bis-dithiocarbamate, no hydrogen sulfide is formed.

Analysis of the product of this example by the carbon disulfide evolution method showed that a substantially theoretical yield of disodium ethylene bis-dithiocarbamate was obtained. Hydrogen sulfide was liberated in the digestion only to the extent of 0.02 mols for the entire 3.0 mols of carbon disulfide used in the preparation of the product. Analysis for nitrogen and sulfur established that the atomic ratio of sulfur to nitrogen in the product was 2.06 compared with a theoretical sulfur to nitrogen ratio of 2.00.

*Example 2*

The procedure of Example 1 was repeated, except that the steady state pH was maintained at 10.5 instead of 9.3, and the pH of the final solution was adjusted to 10.85. No hydrogen sulfide was liberated during the preparation. The product aqueous solution was pale yellow-orange in color and entirely clear. The yield of disodium ethylene bis-dithiocarbamate was essentially quantitative, as determined by the carbon disulfide evolution method. A small quantity of hydrogen sulfide was formed in the analytical digestion of the product aliquot sample at 100° C. with 4.5 N $H_2SO_4$. It amounted to 0.04 mol of hydrogen sulfide for the 3.0 mols of carbon disulfide used in the preparation. The S/N atomic ratio in the product was 1.98.

*Example 3*

Into an apparatus essentially as described in Example 1 was charged 1.5 mols of ethylene diamine as a 10% aqueous solution. Carbon disulfide was then added at 43–46° C. When the pH had dropped to 9.4, carbon disulfide and aqueous sodium hydroxide as a 50% solution were added concurrently, maintaining the pH at 9.4. When all of the carbon disulfide (3.0 mols) had been added and had visibly reacted, the pH was adjusted upwards to 11.35. The final temperature of the reaction mixture was raised to about 48° for about 10 minutes.

No hydrogen sulfide was liberated during the preparation. The clear aqueous solution of the product was a pale orange-yellow in color. The yield of disodium ethylene bis-dithiocarbamate was essentially quantitative, as determined by the carbon disulfide evolution method. A very small quantity of hydrogen sulfide was formed in the analytical digestion of the product aliquot sample at 100° C. with 4.5 N $H_2SO_4$. It amounted to 0.03 mol of hydrogen sulfide for the 3.0 mols of carbon disulfide used in the preparation. The S/N atomic ratio in the product was 2.00.

*Example 4*

Into an apparatus essentially as described in Example 1 was charged 1.0 mols of ethylene diamine as a 40.5% aqueous solution. Carbon disulfide was then added with good agitation at 40–45° C. When the pH had dropped from an initial level of 13 to 9.4, carbon disulfide and sodium hydroxide as a 50% aqueous solution were then added simultaneously at a pH of 9.4 to 9.6. When all the carbon disulfide (2.0 mols) had been added and had visibly reacted, the pH was adjusted upwards to a final level of 11.2.

Colorless solid crystalline disodium ethylene bis-dithiocarbamate hexahydrate separated during the preparation, however, the mixture remained easily stirrable. No hydrogen sulfide was evolved during the preparation. On cooling to 25° C., more crystalline product as the hexahydrate separated. The colorless crystalline disodium ethylene bis-dithiocarbamate hexahydrate was filtered, drained as free of mother liquor as possible (no washing), and dried at room temperature under reduced pressure to free it of physically contained water but not the water of hydration. It contained 29.5% water of crystallization as determined by benzene distillation, and 71.4% disodium ethylene bis-dithiocarbamate on an anhydrous basis as determined by analysis by the carbon disulfide evolution method. The yield to crystalline hexahydrate was 62% of theoretical. The S/N atomic ratio in the crystalline hexahydrate was 2.02.

The aqueous mother liquor contained 37.6% by weight disodium ethylene bis-dithiocarbamate as determined by the carbon disulfide evolution technique. The yield to disodium ethylene bis-dithiocarbamate in the mother liquor was 35%. The total yield of product was 97% of theoretical.

The mother liquors from this preparation were used as a reaction heel for a new preparation similar in procedure and total quantities to the above Example 4. It was found that after two such recycles of aqueous mother liquor, the disodium ethylene bis-dithiocarbamate hexahydrate produced was of equivalent quality to the product of Example 4, and no sacrifice in yield was noticeable.

In preparing dry crystalline disodium ethylene bis-dithiocarbamate hexahydrate one can, after effecting the reaction in accordance with the principles and conditions described above and crystallizing the hexahydrate from the finished reaction mass, separate the hexahydrate by any conventional method for the separation of solids from liquids such as by filtration or centrifuge. The separated hexahydrate can then be dried according to customary techniques for the drying of organic compounds, for example, by drum drying, vacuum graining, or as in Example 4 above by drying at relatively low temperatures under reduced pressure.

The pH limitations recited throughout the specification and in the following claims are based on readings made using a Beckman pH meter equipped with a temperature compensator and with a glass electrode and a calomel electrode.

I claim:

1. In a process wherein a metal salt of an alkylene bis-dithiocarbamic acid is formed by the interaction of the reagents carbon disulfide, an alkylene diamine, and a metal hydroxide having an hydroxyl ion dissociation constant greater than that of the alkylene diamine, the improvement comprising bringing together said reagents for reaction by introducing carbon disulfide and the metal hydroxide into contact with the alkylene diamine in an aqueous medium, while agitating the resulting aqueous mass, at such rates relative to each other as to keep the pH of the aqueous mass within the range of 8.5 to 11.0 thruout the reaction period.

2. In a process wherein a metal salt of ethylene bis-dithiocarbamic acid is formed by the interaction of the reagents carbon disulfide, ethylene diamine, and a metal hydroxide having an hydroxyl ion dissociation constant greater than that of ethylene diamine, the improvement comprising bringing together said reagents for reaction by introducing carbon disulfide and the metal hydroxide into contact with the ethylene diamine in an aqueous medium, while agitating the resulting aqueous mass, at such rates relative to each other as to keep the pH of the aqueous mass within the range of 8.5 to 11.0 thruout the reaction period, said reaction being carried out at a temperature not substantially in excess of about 60° C.

3. In a process wherein disodium ethylene bis-dithiocarbamate is formed by the interaction of the reagents carbon disulfide, ethylene diamine, and sodium hydroxide, the improvement comprising bringing together said reagents for reaction by introducing carbon disulfide and sodium hydroxide into contact with the ethylene diamine in an aqueous medium, while agitating the resulting aqueous mass, at such rates relative to each other as to keep the pH of the aqueous mass within the range of 8.5 to 11.0 thruout the reaction period.

4. In a process wherein disodium ethylene bis-dithiocarbamate is formed by the interaction of the reagents carbon disulfide, ethylene diamine, and sodium hydroxide, the improvement comprising bringing together said reagents for reaction by introducing carbon disulfide and an aqueous solution of sodium hydroxide into contact with an aqueous solution of the ethylene diamine, while agitating the resulting aqueous mass, at such rates relative to each other as to keep the pH of the aqueous mass within the range of 9.0 to 10.5 thruout the reaction period, said reaction being carried out at a temperature not substantially in excess of about 60° C.

5. In a process wherein disodium ethylene bis-dithiocarbamate is formed by the interaction of the reagents carbon disulfide, ethylene diamine, and sodium hydroxide, the improvement which comprises first adding carbon disulfide gradually and with agitation to a solution consisting essentially of ethylene diamine in water to lower the pH of said ethylene diamine solution to within the range of 9.0 to 10.5, then feeding both carbon disulfide and an aqueous solution of sodium hydroxide gradually and with agitation into said pH-adjusted ethylene diamine at a temperature of about 40° C. to 55° C. and at such rates relative to each other as to keep the pH of the resulting reacting aqueous mass within said range of 9.0 to 10.5 until approximately two mols of carbon disulfide have been consumed in the reacting mass for each mol of ethylene diamine used in the process, then terminating the introduction of carbon disulfide and, if the pH of the aqueous mass is then below about 10.0, adding additional sodium hydroxide as required to bring the pH of the aqueous mass within the range of 10.0 to 11.5.

6. A process for the preparation of dry crystalline disodium ethylene bis-dithiocarbamate hexahydrate which comprises interacting the reagents carbon disulfide, ethylene diamine, and sodium hydroxide by bringing together said reagents for reaction by introducing carbon disulfide and sodium hydroxide into contact with the ethylene diamine in an aqueous medium, while agitating the resulting aqueous mass, at such rates relative to each other as to keep the pH of the aqueous mass within the range of 8.5 to 11.0 thruout the reaction period, crystallizing disodium ethylene bis-dithiocarbamate hexahydrate from the resulting aqueous mass, separating the hexahydrate from the aqueous mass and drying the separated hexahydrate.

7. In a process wherein a metal salt of an alkylene bis-dithiocarbamic acid is formed by the interaction of the reagents carbon disulfide, an alkylene diamine, and a metal hydroxide having an hydroxyl ion dissociation constant greater than that of the alkylene diamine, the improvement comprising effecting said interaction by bringing said reagents together in an agitated aqueous reaction mass having a pH within the range of 8.5 to 11.0 thruout the reaction period.

References Cited in the file of this patent

UNITED STATES PATENTS

| Number | Name | Date |
|---|---|---|
| 1,983,240 | Olin | Dec. 4, 1934 |
| 2,229,562 | Gracia | Jan. 21, 1941 |
| 2,317,765 | Hester | Apr. 27, 1943 |
| 2,356,764 | Kern | Aug. 29, 1944 |
| 2,561,208 | Kirk | July 17, 1951 |
| 2,563,007 | Crouch | Aug. 7, 1951 |
| 2,609,389 | Flenner | Sept. 2, 1952 |